Figure 1:
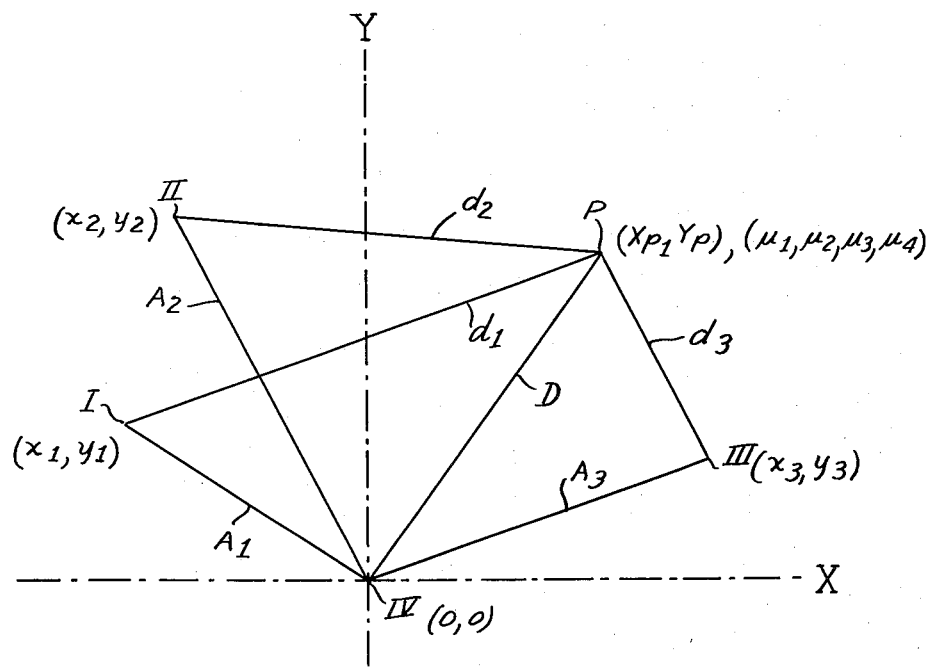

Feb. 7, 1961   N. J. ZABB ET AL   2,970,767
FOUR-STATION PHASE COMPARISON
Filed June 24, 1957   2 Sheets-Sheet 2

United States Patent Office 2,970,767
Patented Feb. 7, 1961

2,970,767

FOUR-STATION PHASE COMPARISON

Norman J. Zabb, Brooklyn, and Herbert W. Bomzer, New Hyde Park, N.Y., assignors to Sperry Rand Corporation, Ford Instrument Company Division, Long Island City, N.Y., a corporation of Delaware Filed June 24, 1957, Ser. No. 668,280

3 Claims. (Cl. 235—187)

This invention relates to automatic four station navigational systems and particularly to an automatic analog device for accurately converting plane hyperbolic coordinates to plane rectangular coordinates.

Conventional three-station-radio-phase-comparison systems for determining the geographic position of an aircraft having an altitude which is small in comparison with its distance from the ground stations furnish both a true and a spurious position as represented by the two intersection points of two hyperbolas. Such ambiguity is normally resolved by employing an additional system incorporating a radar compass or a frequency standard technique.

The inclusion of a fourth ground transmitting station will resolve the ambiguity by providing a third hyperbolic curve, the three hyperbolas being able to intersect at only one common point.

For a four-station-navigational system employing four ground station transmitters to provide hyperbolic coordinates of the true relative aircraft position from airborne receivers and airborne phase comparators, the mathematical conversion of plane hyperbolic coordinates of an aircraft position to equivalent plane rectangular coordinates can be effected by the application of the following formulae:

$$X_p = \frac{(A_1^2 - u_1)(u_3 y_2 u_2 y_3) + (A_2^2 - u_2^2)(u_1 y_3 u_3 y_1) + (A_3^2 - u_3^2)(u_2 y_1 - u_1 y_2)}{2[u_1(x_2 y_3 - x_3 y_2) + u_2(x_3 y_1 - x_1 y_3) + u_3(x_1 y_2 - x_2 y_1)]}$$

$$Y_p = \frac{(A_1^2 - u_1^2)(u_2 x_3 - u_3 x_2) + (A_2^2 - u_2^2)(u_3 x_1 - u_1 x_3) + (A_3^2 - u_3^2)(u_1 x_2 - u_2 x_1)}{2[u_1(x_2 y_3 - x_3 y_2) + u_2(x_3 y_1 - x_1 y_3) + u_3(x_1 y_2 - x_2 y_1)]}$$

wherein:

$X_p$ and $Y_p$ are the rectangular coordinates of an aircraft position represented by a point P, the hyperbolic coordinates of point P are defined as $u_1 = d_1 - D$, $u_2 = d_2 - D$ and $u_3 = d_3 - D$, the distances $d_1$, $d_2$, $d_3$ and $D$ being the scalar distances of the point P from the four ground stations I, II, III, and IV the rectangular coordinates of the ground stations I, II and III relative to the origin at station IV are $(x_1, y_1)$, $(x_2, y_2)$ and $(x_3, y_3)$ the scalar distances from the origin to the ground stations I, II and III are $A_1$, $A_2$ and $A_3$, respectively.

In general, the invention contemplates an analog device which responds to the mathematics for the conversion of plane hyperbolic coordinates to plane rectangular coordinates in the successive steps as suggested by the above formulae from given input data of $u_1$, $u_2$, $u_3$, $A_1$, $A_2$, $A_3$, $x_1$, $x_2$, $x_3$, $y_1$, $y_2$, and $y_3$. In its embodiments the converter will comprise combinations of potentiometers, amplifiers, adding networks and closed loop servomechanism systems.

Figure 2:
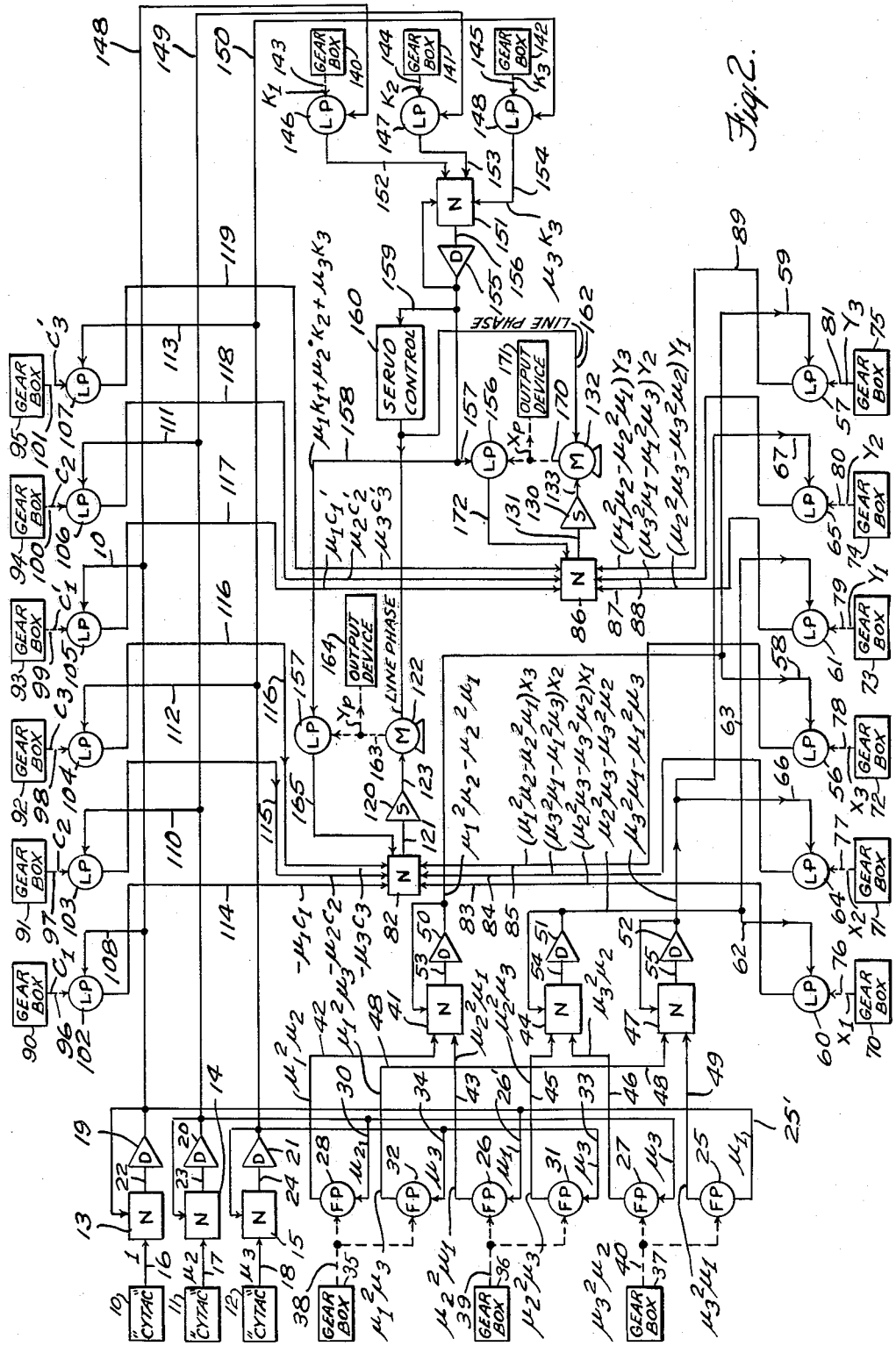

The features of the invention will be understood more clearly from the following detailed description taken in conjunction with the accompanying drawings, in which:

Fig. 1 is a plane representation of an aircraft relative to four reference station transmitters; and Fig. 2 is a schematic diagram of an analog device for automatically converting hyperbolic coordinates relative to four ground stations into rectangular coordinates relative to one of the ground stations.

Referring to the plane diagram in Fig. 1, point P is the location of an aircraft having plane hyperbolic coordinates $u_1$, $u_2$ and $u_3$ relative to four ground station transmitters at I, II, III and IV, the altitude of the aircraft being small compared to its distance from the points I, II, III and IV and the hyperbolic coordinate quantities $u_1$, $u_2$, $u_3$ and $u_4$ being provided in the aircraft by airborne receivers and airborne phase comparators. The point P has plane rectangular coordinates $X_p$ along the X axis and $Y_p$ along the Y axis in a system of convenient rectangular coordinates having its origin at the point IV. In the rectangular coordinate system, station I has coordinates $x_1$ and $y_1$, station II has coordinates $x_2$ and $y_2$ and station III has coordinates $x_3$ and $y_3$. The scalar distance between points I and IV is $A_1$, between points II and IV is $A_2$, between points III and IV is $A_3$, between points P and IV is D, between points I and P is $d_1$, between II and P is $d_2$ and between points III and P is $d_3$.

In the aircraft at point P, the embodiments of this invention will continuously and automatically provide the rectangular coordinates $X_p$ and $Y_p$ in analog form for known input data of $x_1$, $x_2$, $x_3$, $y_1$, $y_2$, $y_3$, $A_1$, $A_2$, $A_3$, $u_1$, $u_2$ and $u_3$ in accordance with the following formulae:

$$X_p = y_1(u_2^2 u_3 - u_3^2 u_2) + y_2(u_3^2 u_1 - u_1^2 u_3) \\ + y_3(u_1^2 u_2 - u_2^2 u_1) + u_1 C_1^1 + u_2 C_2^1 + u_3 C_3^1 / \\ 2[u_1 K_1 + u_2 K_2 + u_3 K_3] \quad (1)$$

$$Y_p = -[x_1(u_2^2 u_3 - u_3^2 u_2) + x_2(u_3^2 u_1 - u_1^2 u_3) \\ + x_3(u_1^2 u_2 - u_2^2 u_1) - u_1 C_1 - u_2 C_2 - u_3 C_3] / \\ 2[u_1 K_1 + u_2 K_2 + u_3 K_3] \quad (2)$$

wherein:

$$u_1 = d_1 - D \quad (3)$$
$$u_2 = d_2 - D \quad (4)$$
$$u_3 = d_3 - D \quad (5)$$

$$C_1 = x_2 A_3^2 - x_3 A_2^2 \quad (6)$$
$$C_2 = x_3 A_1^2 - x_1 A_3^2 \quad (7)$$
$$C_3 = x_1 A_2^2 - x_2 A_1^2 \quad (8)$$
$$C_1^1 = y_3 A_a^2 - y_2 A_3^2 \quad (9)$$
$$C_2^1 = y_1 A_3^2 - y_3 A_1^2 \quad (10)$$
$$C_3^1 = y_2 A_1^2 - y_1 A_2^2 \quad (11)$$
$$K_1 = x_2 y_3 - x_3 y_2 \quad (12)$$
$$K_2 = x_3 y_1 - x_1 y_3 \quad (13)$$
$$K_3 = x_1 y_2 - x_2 y_1 \quad (14)$$

Referring to the analog coordinate converter of Fig. 2, "Cytac" receivers 10, 11 and 12 provide electrical inputs to the converter in direct proportion to the quantities $u_1$, $u_2$ and $u_3$, respectively. "Cytac" receivers are fully described and their operation explained in the printed lecture delivered and distributed by employees of the applicants' assignee on March 24, 1957, and subsequently reprinted in the 1957 I.R.E. National Convention Record.

The output of devices 10, 11 and 12 are connected to adding networks 13, 14 and 15 by cables 16, 17 and 18, respectively. The output of the adding networks 13, 14 and 15, are connected to the input of amplifiers 19, 20 and 21 by cables 22, 23 and 24, respectively. The output of amplifier 19 containing the information $u_1$ is connected to the inputs of non-linear, function potentiometers 25 and 26 by cables 25′ and 26′, respectively. The output of amplifier 20 containing the information $u_2$ is connected to the inputs of non-linear, function potentiometers 27 and 28 by cables 29 and 30, respectively. The output of amplifier 21 containing the information $u_3$ is connected to the inputs of non-linear function potentiometers 31 and 32 by cables w 33 and 34, respectively.

Mechanical crank and gear devices 35, 36 and 37 mechanically displace shafts 38, 39 and 40 in direct proportion to the input quantities $u_1$, $u_2$ and $u_3$, respectively. Shaft 38 is connected to the shafts of the non-linear, function potentiometers 28 and 32; shaft 39 is connected to the shafts of the non-linear, function potentiometers 26 and 31; and shaft 40 is connected to the shafts of the non-linear, function potentiometers 27 and 25 respectively. The output of the non-linear, function potentiometers 28 and 26 containing in the information $(u_1^2 u_2)$ and $(u_2^2 u_1)$ are connected to the input of an adding network 41 by cables 42 and 43, respectively. The output of the non-linear, function potentiometers 31 and 27 containing the information $(u_2^2 u_3)$ and $(u_3^2 u_2)$ are connected to the input of an adding network 44 by cables 45 and 46, respectively. The output of the non-linear, function potentiometers 32 and 25 containing the information $(u_1^2 u_3)$ and $(u_3^2 u_1)$ are connected to an adding network 47 by cables 48 and 49, respectively. The output of the adding networks 41, 44 and 47 is connected to dual amplifiers 50, 51 and 52 by cables 53, 54 and 55, respectively. The dual amplifiers are high gain line amplifiers adapted to drive more than one load. The output for example, of the amplifier 50 containing the information $(u_1^2 u_2 - u_2^2 u_1)$ is connected to the input of the two linear potentiometers 56 and 57 by cables 58 and 59, respectively. The output of amplifier 51 containing the information $(u_2^2 u_3 - u_3^2 u_2)$ is connected to the input of linear potentiometers 60 and 61 by cables 62 and 63, respectively. The output of amplifiers 52 containing the information $(u_3^2 u_1 - u_1^2 u_3)$ is connected to the input of linear potentiometers 64 and 65 by cables 66 and 67, respectively.

Mechanical crank and gear devices 70, 71, 72, 73, 74 and 75 mechanically displace shafts 76, 77, 78, 79, 80 and 81 in direct proportion to the input quantities $x_1$, $x_2$, $x_3$, $y_1$, $y_2$ and $y_3$, respectively. Shafts 76, 77, 78, 79, 80 and 81 are connected to the shafts of the linear potentiometers 60, 64, 56, 61, 65 and 57, respectively. The output of linear potentiometers 60, 64 and 56 containing the information $(u_2^2 u_3 - u_3^2 u_2)x_1$, $(u_3^2 u_1 - u_1^2 u_3)x_2$ and $(u_1^2 u_2 - u_2^2 u_1)x_3$ are connected to three of six adding input terminals in one input side of an adding network 82 by cables 83, 84 and 85 respectively. The output of linear potentiometers 61, 65 and 57 containing the information $(u_2^2 u_3 - u_3^2 u_2)y_1$, $(u_3^2 u_1 - u_1^2 u_3)y_2$ and $$(u_1^2 u_2 - u_2^2 u_1)y_3$$

are connected to three of six adding input terminals in one input side of an adding network 86 by cables 87, 88 and 89, respectively.

Mechanical crank and gear devices 90, 91, 92, 93, 94 and 95 are adapted to mechanically displace shafts 96, 97, 98, 99, 100 and 101 in direct proportion to the previously computed quantities $C_1$, $C_2$, $C_3$, $C_1^1$, $C_2^1$ and $C_3^1$ as calculated from the input data in accordance with Equations 6, 7, 8, 9, 10 and 11, respectively. Shafts 96, 97, 98, 99, 100 and 101 are connected to the shafts of linear potentiometers 102, 103, 104, 105, 106 and 107, respectively. The electrical input sides of the linear potentiometers 102 and 105 are connected to the output of the amplifier 19 by cables 108 and 109, respectively. The electrical input sides of the linear potentiometers 103 and 106 are connected to the output of the amplifier 20 by cables 110 and 111, respectively; and the electrical input sides of the linear potentiometer 104 and 107 are connected to the output of the amplifier 21 by cables 112 and 113, respectively.

The output sides of the linear potentiometers 102, 103 and 104 containing the information $(-u_1 C_1)$, $(-u_2 C_2)$ and $(-u_3 C_3)$ are connected to the other three adding input terminals in the prior mentioned input side of the adding network 82 by cables 114, 115, and 116, respectively. The output sides of the linear potentiometers 105, 106 and 107 containing the information $(u_1 C_1^1)$, $(u_2 C_2^1)$ and $(u_3 C_3^1)$ are connected to the other three adding input terminals in the prior mentioned input side of the adding network 86 by cables 117, 118 and 119, respectively.

The adding output of the network 82 is connected to the input of a servoamplifier 120 by a cable 121 which receives the coordinate computing information required by Equation 2 and the output of the servoamplifier 120 is connected to the control phase winding of a two phase servometer 122 by a cable 123. The adding output of the network 86 is connected to the input of a servoamplifier 130 by a cable 131 which receives the coordinate computing information required by Equation 1 and the output of the servoamplifier 130 is connected to the control phase winding of a two phase servomotor 132 by a cable 133.

Mechanical crank and gear devices 140, 141 and 142 are adapted to mechanically displace shafts 143, 144 and 145 in direct proportion to the computation quantities $K_1$, $K_2$ and $K_3$ which are previously calculated from observed data in accordance with Equations 12, 13 and 14, respectively. Shafts 143, 144 and 145 are connected to the shafts of linear potentiometers 146, 147 and 148 respectively. The electrical input side of linear potentiometers 146, 147 and 148 are connected to the output of the amplifiers 19, 20 and 21 by cables 148, 149 and 150, respectively. The output of the linear potentiometers 146, 147 and 148 containing the information $(u_1 k_1)$, $(u_2 k_2)$ and $(u_3 k_3)$ respectively is connected to a network 151 by cables 152, 153 and 154, respectively. The output of the network 151 is connected to the input of an amplifier 155 by a cable 156a and the output of the amplifier 155 containing the information $$(u_1 k_1 + u_2 k_2 + u_3 k_3)$$

is connected to the input of a linear potentiometer 156 by a cable 157 and to the input of a linear potentiometer 157 by a cable 158. The output of the amplifier 155 is also connected by a cable 159 to the input of a servo control device 160 and the latter's output is connected to the line phase windings of the servomotors 122 and 132 by cables 161 and 162, respectively, the servo control device 160 providing the proper lag control for promoting system stability. It is thus seen that this lag control signal on cables 159, 161 and 162 is derived from the output of the amplifier 155 which is proportional to $$(u_1 k_1 + u_2 k_2 + u_3 k_3)$$

Shaft 163 of the servomotor 122 is connected to drive the shaft of the linear potentiometer 157 and a shaft of an output device 164. The output of the linear potentiometer 157 is connected to the other input side of the differential network 82 by a cable 165. The shaft 163 of the servomotor 122 will continue to turn until the adding output of the network 82 is nulled. At this quiescent condition, Equation 2 will be satisfied and the shaft 163 connected to the output device 164 will be displaced in direct proportion to the coordinate quantity $Y_p$.

Shaft 170 of the servomotor 132 is connected to drive the shaft of the linear potentiometer 156 and a shaft of an output device 171. The output of the linear potentiometer 156 is connected to the other input side of the adding network 86 by a cable 172. The shaft 170 of the servomotor 132 will continue to turn until the adding output of the network 86 is zero. At this quiescent condition, Equation 1 will be satisfied and the shaft 170 connected to the output device 171 will be displaced in direct proportion to the coordinate quantity $X_p$.

In accordance with conventional techniques, a portion of the outputs of the amplifiers 19, 20, 21, 50, 51, 52 and 155 are fed back to their input sides for the promotion of system stability.

It is to be understood that various modifications of the invention other than those above described may be effected by persons skilled in the art without departing from the principle and scope of the invention as defined in the appended claims.

What is claimed is:

1. An analog computation device for converting plane hyperbolic coordinates to plane rectangular coordinates comprising means for continuously mechanizing and solving the equation having the basic form:

$$X_p = y_1(u_2{}^2 u_3 - u_3{}^2 u_2) + y(u_3{}^2 - u_1{}^2 u_3)$$
$$+ y_3(u_1{}^2 u_2 - u_2{}^2 u_1) + u_1 C_1{}^1 + u_2 C_2{}^1$$
$$+ u_3 C_3{}^1 / 2[u_1 k_1 + u_2 k_2 + u_3 k_3]$$

$$Y_p = -[x_1(u_2{}^2 u_3 - u_3{}^2 u_2) + x_2(u_3{}^2 u_1 - u_1{}^2 u_3)$$
$$+ x_3(u_1{}^2 u_2 - u_2{}^2 u_1) - u_1 C_1 - u_2 C_2$$
$$- u_3 C_3]/2[u_1 k_1 + u_2 k_2 + u_3 k_3]$$

to obtain continuously the rectangular coordinate quantities $X_p$ and $Y_p$ of a point P which are related to four reference points I, II, III and IV, a rectangular coordinate system having an X and a Y axis with the origin at the said point IV, the scalar distance between the points I and IV being $A_1$, the scalar distance between the points II and IV being $A_2$, the scalar distance between the points III and IV being $A_3$, the rectangular coordinates of the point I being $x_1$ and $y_1$, the rectangular coordinates of the point II being $x_2$ and $y_2$, and the rectangular coordinates of the point III being $x_3$ and $y_3$ the point P having hyperbolic coordinates $u_1$, $u_2$ and $u_3$ relative to points I, II, III and IV and being at a distance D from the rectangular coordinate origin, the scalar distance between the point P and I being $d_1$, the scalar distance between the points P and II being $d_2$, the scalar distance between the points P and III being $d_3$, and wherein $u_1$ is equal to $(d_1-D)$, $u_2$ is equal to $(d_2-D)$, $u_3$ is equal to $(d_3-D)$, $C_1{}^1$ is equal to the computation quantity $(y_3 A_2{}^2 - y_2 A_3{}^2)$, $C_2{}^1$ is equal to the computation quantity $(y_1 A_3{}^2 - y_3 A_1{}^2)$, $C_3{}^1$ is equal to the computation quantity $(y_3 A_1{}^2 - y_1 A_2{}^2)$, $k_1$ is equal to the computation quantity $(x_2 y_3 - x_3 y_2)$, $k_2$ is equal to the computation quantity $(x_3 y_1 - x_1 y_3)$ and $k_3$ is equal to the computation quantity $(x_1 y_2 - x_2 y_1)$, and the said computation device comprising means for continuously mechanizing and solving the said equations including means responsive to said $u_1$, $u_2$, $u_3$, $C_1{}^1$, $C_2{}^1$ and $C_3{}^1$ for obtaining the computation quantities $(u_1 C_1{}^1)$, $(u_2 C_2{}^1)$ and $(u_3 C_3{}^1)$, means responsive to said $u_1$, $u_2$, $u_3$, $y_1$, $y_2$ and $y_3$ for obtaining the computation quantities $(u_1{}^2 u_2 - u_2{}^2 u_1) y_3$, $(u_3{}^2 u_1 - u_1{}^2 u_3) y_2$ and $(u_2{}^2 u_3 - u_3{}^2 u_2) y_1$, means responsive to said $u_1$, $u_2$, $u_3$, $k_1$, $k_2$ and $k_3$ for obtaining the computation quantity $(u_1 k_1 + u_2 k_2 + u_3 k_3)$, addition-division means connected to the said $(u_1 C_1{}^1)$ computing means, the said $(u_2 C_2{}^1)$ computing means, the said $(u_3 C_3{}^1)$ computing means, the said $(u_1{}^2 u_2 - u_2{}^2 u_1) y_3$ computing means, the said $(u_3{}^2 u_1 - u_1{}^2 u_3) y_2$ computing means, the said $(u_2{}^2 u_3 - u_3{}^2 u_2) y_1$ computing means and the said $$(u_1 k_1 + u_2 k_2 + u_3 k_3)$$

computing means for adding the six computation quantities $(u_1 C_1{}^1)$, $(u_2 C_2{}^1)$, $(u_3 C_3{}^1)$, $(u_1{}^2 u_2 - u_2{}^2 u_1) y_3$, $(u_3{}^2 u_1 - u_1{}^2 u_3) y_2$ and $(u_2{}^2 u_3 - u_3{}^2 u_2) y_1$ and dividing this sum by the computation quantity $(u_1 k_1 + u_2 k_2 + u_3 k_3)$ for obtaining the computation quantity $X_p$.

2. An analog computation device as claimed in claim 1 wherein the said addition-division means comprises an adding network having six adding input terminals in one input side and one input terminal in the other input side, each of the six adding input terminals in one input side of the said adding network being connected respectively to the said $(u_1 C_1{}^1)$ computing means, the said $(u_2 C_2{}^1)$ computing means, the said $(u_3 C_3{}^1)$ computing means, the $(u_1{}^2 u_2 - u_2{}^2 u_1) y_3$ computing means, the said $$(u_3{}^2 u_1 - u_1{}^2 u_3) y_2$$

computing means and the said $(u_2{}^2 u_3 - u_3{}^2 u_2) y_1$ computing means, a servoamplifier connected in driven relationship to the output side of the said adding network, a servomotor connected in driven relationship to the said servoamplifier and a potentiometer operatively connected to and driven by the said servomotor, the said $$(u_1 k_1 + u_2 k_2 + u_3 k_3)$$

computing means being connected to the input side of said potentiometer and the output side of said potentiometer being connected to the other input side of said adding network, whereby the servomotor displaces in direct proportion to the coordinate quantity $X_p$.

3. An analog computation device for converting plane hyperbolic coordinates to plane rectangular coordinates comprising means for continuously mechanizing and solving equations having the basic form:

$$X_p = y_1(u_2{}^2 u_3 - u_3{}^2 u_2) + y_2(u_1{}^2 u_1 - u_1{}^2 u_3)$$
$$+ y_3(u_1{}^2 u_2 - u_2{}^2 u_1) + u_1 C_1{}^1 + u_2 C_2{}^1$$
$$+ u_3 C_3{}^1 / 2[u_1 k_1 + u_2 k_2 + u_3 k_3]$$

and $$Y_p = -[x_1(u_2{}^2 u_3 - u_3{}^2 u_2) + x_2(u_3{}^2 u_1 - u_1{}^2 u_3)$$
$$+ x_3(u_1{}^2 u_2 - u_2{}^2 u_1) - u_1 C_1 - u_2 C_2$$
$$- u_3 C_3]/2[u_1 k_1 + u_2 k_2 + u_3 k_3]$$

to obtain continuously the rectangular coordinate quantities $X_p$ and $Y_p$ of a point P are related to: four reference points I, II, III and IV, a rectangular coordinate system having an X and Y axis with the origin at the said point IV, the scalar distance between the points I and IV being $A_1$, the scalar distance between the points II and IV being $A_2$, the scalar distance between points III and IV being $A_3$, the rectangular coordinates of point I being $x_1$ and $y_1$, the rectangular coordinates of point II being $x_2$ and $y_2$ and the rectangular coordinates of and IV and being at a distance D from the rectangular coordinates $u_1$, $u_2$ and $u_3$ relative to points I, II, III and IV and being at a pistance D from the rectangular coordinate origin, the scalar distance between the points P and I being $d_1$, the scalar distance between the points P and II being $d_2$, the scalar distance between the points P and III being $d_3$, and wherein $u_1$ is equal to $(d_1-D)$, $u_2$ is equal to $(d_2-D)$, $u_3$ is equal to $(d_3-D)$, $C_1$ is equal to the computation quantity $(x_2 A_3{}^2 - x_3 A_2{}^2)$, $C_2$ is equal to the computation quantity $(x_3 A_1{}^2 - x A_3{}^2)$, $C_3$ is equal to the computation quantity $(x_1 A_2{}^2 - x_2 A_1{}^2)$, $C_1{}^1$ is equal to the computation quantity $(y_2 A_2{}^2 - y_2 A_3{}^2)$, $C_2{}^1$ is equal to the computation quantity $(y_1 A_3{}^2 - y_3 A_1{}^2)$, $C_3{}^1$ is equal to the computation quantity $(y_3 A_1{}^2 - y_1 A_2{}^2)$, $K_1$ is equal to the computation quantity $(x_2 y_3 - x_3 y_2)$, $K_2$ is equal to the computation quantity $(x_3 y_1 - x_1 y_3)$ and $K_3$ is equal to the computation quantity $(x_1 y_2 - x_2 y_1)$ and the said computation device comprising means for continuously mechanizing and solving the said equations includes means responsive to said $u_1$, $u_2$, $u_3$, $C_1{}^1$, $C_2{}^1$ and $C_3{}^1$ for obtaining the computation quantities $(u_1 C_1{}^1)$, $(u_2 C_2{}^1)$ and $(u_3 C_3{}^1)$, means responsive to said $u_1$, $u_2$, $u_3$, $y_1$, $y_2$ and $y_3$ for obtaining the computation quantities $(u_1{}^2 u_2 - u_2{}^2 u_1) y_3$, $(u_3{}^2 u_1 - u_1{}^2 u_3) y_2$ and $$(u_2{}^2 u_3 - u_3{}^2 u_2) y_1$$

a first adding network having six adding inputs in one input side and one input in the other input side, each of the six adding inputs in one input side being connected respectively to the said $(u_1 C_1{}^1)$, $(u_2 C_2{}^1)$, $(u_3 C_3{}^1)$, $(u_1{}^2 u_2 - u_2{}^2 u_1) y_3$, $(u_3{}^2 u_1 - u_1{}^2 u_3) y_2$ and $(u_2{}^2 u_3 - u_3{}^2 u_2) y_1$ computing means, a first servo amplifier connected in driven relationship to the output side of the said first adding network, a first servomotor connected in driven relationship to the first servoamplifier, a first potentiometer operatively connected to and driven by the said first servomotor, means responsive to said $u_1$, $u_2$, $u_3$, $k_1$, $k_2$ and $k_3$ for obtaining the computation quantity $(u_1k_1+u_2k_2+u_3k_3)$, the input side of the said first potentiometer being connected to the $(u_1k_1+u_2k_2+u_3k_3)$ computing means, the output side of the said first potentiometer being connected to the other input side of said first adding network, means responsive to said $u_1$, $u_2$, $u_3$, $C_1$, $C_2$ and $C_3$ for obtaining the computation quantities $(-u_1C_1)$, $(-u_2C_2)$ and $(-u_3C_3)$, means responsive to said $u_1$, $u_2$, $u_3$, $x_1$, $x_2$, and $x_3$ for obtaining the computation quantities $(u_1^2u_2-u_2^2u_1)x_3$, $(u_3^2u_1-u_1^2u_3)x_2$ and $(u_2^2u_3-u_3^2u_2)x_1$, a second adding network having six adding inputs in one input side and one input in the other input side, each of the six adding inputs in one input side being connected respectively to the said $(-u_1C_1)$, $(-u_2C_2)$, $(-u_3C_3)$, $(u_1^2u_2-u_2^2u_1)x_3$ $(u_3^2u_1-u_1^2u_3)x_2$ and $(u_2^2u_3-u_3^2u_2)x_1$ computing means, a second servoamplifier connected in driven relationship to the output side of the said second adding network, a second servomotor connected in driven relationship to the second servoamplifier, a second potentiometer operatively connected to and driven by the second servomotor, the input side of the said second potentiometer being connected to the $(u_1k_1+u_2k_2+u_3k_3)$ computing means and the output side of the second potentiometer being connected to the other input side of said second adding network, whereby the shaft of the first servomotor displaces in direct proportion to the coordinate quantity $X_p$ and the shaft of the second servomotor displaces in direct proportion to the coordinate quantity $Y_p$.

References Cited in the file of this patent
UNITED STATES PATENTS

| | | |
|---|---|---|
| 2,530,428 | Gray | Nov. 21, 1950 |
| 2,581,438 | Palmer | Jan. 8, 1952 |
| 2,681,764 | Gale | June 22, 1954 |